(12) United States Patent
Ulianov et al.

(10) Patent No.: US 11,386,580 B1
(45) Date of Patent: Jul. 12, 2022

(54) SYSTEM APPARATUS AND METHOD FOR GUIDING USER TO COMPLY WITH APPLICATION-SPECIFIC REQUIREMENTS

(71) Applicant: Goodsize Inc., Wilmington, DE (US)

(72) Inventors: Dmitrii Ulianov, Moscow (RU); Sergei Sherman, Givatayim (IL); Ilya Krotov, Kaliningrad (RU)

(73) Assignee: GOODSIZE INC., Wilmington, DE (US)

( * ) Notice: Subject to any disclaimer, the term of this patent is extended or adjusted under 35 U.S.C. 154(b) by 0 days.

(21) Appl. No.: 17/402,410

(22) Filed: Aug. 13, 2021

(51) Int. Cl.
G06T 7/73 (2017.01)
G06T 7/00 (2017.01)
G06N 3/04 (2006.01)

(52) U.S. Cl.
CPC .............. *G06T 7/74* (2017.01); *G06N 3/0454* (2013.01); *G06T 7/0002* (2013.01); *G06T 2207/30168* (2013.01)

(58) Field of Classification Search
CPC ...................... G06T 7/74; G06T 7/0002; G06T 2207/30168; G06N 3/0454
See application file for complete search history.

(56) References Cited

U.S. PATENT DOCUMENTS

| 8,379,937 | B1 * | 2/2013 | Moon | G06K 9/00281 |
| | | | | 382/118 |
| 10,758,309 | B1 * | 9/2020 | Chow | G06N 20/00 |
| 10,810,725 | B1 * | 10/2020 | Dolhansky | G06T 1/0028 |
| 10,977,520 | B2 * | 4/2021 | Turkelson | G06K 9/00751 |
| 2012/0092519 | A1 * | 4/2012 | Song | G06K 9/2027 |
| | | | | 348/222.1 |
| 2018/0165831 | A1 * | 6/2018 | Kwant | G06T 7/74 |
| 2019/0042833 | A1 * | 2/2019 | Gernoth | G06K 9/00221 |
| 2019/0370532 | A1 * | 12/2019 | Soni | G06T 7/11 |
| 2020/0253541 | A1 * | 8/2020 | Okada | A61B 5/1116 |
| 2020/0304707 | A1 * | 9/2020 | Williams | G06T 7/73 |
| 2020/0380273 | A1 * | 12/2020 | Saez | G06K 9/6278 |
| 2021/0004945 | A1 * | 1/2021 | Li | G06K 9/6267 |
| 2021/0090289 | A1 * | 3/2021 | Karanam | G06K 9/6262 |
| 2021/0103736 | A1 * | 4/2021 | Toyoda | H04N 5/23219 |
| 2021/0118157 | A1 * | 4/2021 | LeGendre | G06T 5/007 |
| 2021/0150792 | A1 * | 5/2021 | Ulyanov | G06N 20/00 |
| 2021/0166070 | A1 * | 6/2021 | Mahbub | G06K 9/6232 |
| 2021/0264576 | A1 * | 8/2021 | Sun | G06T 5/008 |
| 2021/0289604 | A1 * | 9/2021 | Ando | G06K 9/4628 |
| 2021/0327066 | A1 * | 10/2021 | Kim | G06N 3/088 |
| 2021/0358197 | A1 * | 11/2021 | Shysheya | G06T 17/10 |

* cited by examiner

*Primary Examiner* — Xuemei G Chen (74) *Attorney, Agent, or Firm* — The Roy Gross Law Firm, LLC; Roy Gross (57) ABSTRACT

A system, device, and a method for guiding a user to comply with one or more application-specific requirements by using sequentially two or more neural networks run on one more video frame of a scene to detect at least one requirement of the one or more application-specific requirements. Upon the detection result, the application guides a user to adjust the scene based on the detection until the scene is adjusted to meet the application-specific requirements.

16 Claims, 4 Drawing Sheets

SYSTEM APPARATUS AND METHOD FOR GUIDING USER TO COMPLY WITH APPLICATION-SPECIFIC REQUIREMENTS

TECHNICAL FIELD

Some embodiments described herein generally relayed to Artificial Intelligent (AI), and more specifically, to neural networks.

BACKGROUND

Applications that may use AI may use neural networks that have been trained on a specific dataset. Neural networks may be used to predict, for example, processes, movements, etc. and/or to detect faces, smiles, posture, pose, body parts, etc.

However, the prediction and/or detection by Neural networks in real-time may take time which is not acceptable when operation in real-time must be done as soon as possible (ASP).

Thus, there is a need to provide a solution to the lack of ability to provide accurate, live feedback for a user based on his actions which may be based on real-time image analysis.

SUMMARY

Embodiments related to a system, a method, and a product for generating a map of subsurface utilities are described hereinbelow by the ways of example only.

One embodiment may include a system for guiding a user to comply with one or more application-specific requirements comprising a user device comprises processing circuitry and one or more sensors, wherein the processing circuitry is configured to: receive one or more video frames which include an at least one image of a scene from the one or more sensors; run a neural network on the at least one image to detect an at least one requirement of the one or more application-specific requirements based on a dataset, wherein the detection is done based on at least one or more images stored at the dataset; provide one or more directions to the user to adjust one or more elements in the scene to meet the at least one requirement; and repeat the guiding with one or more other neural networks trained on one or more other datasets until the one or more application-specific requirements at the scene are met.

For example, the at least one requirement comprises a position of one or more body parts and the first neural network is configured to detect the position of the one or more body parts based on one or more images of the dataset; and provide directions to adjust the position of the one or more body parts.

For example, the at least one requirement comprises a predetermined pose of a user, and the neural network is configured to detect the predetermined pose of the user; and provide directions to adjust the pose of the user to match the predetermined pose.

For example, the at least one requirement comprises an one or more environmental conditions of the scene, and the processing circuitry is configured to: run one the neural network to detect the one or more environmental conditions; and provide directions to adjust the one or more environmental conditions to the application-specific requirement.

For example, the at least one requirement comprises an angle between the legs, and the processing circuitry is configured to: run the neural network to detect an angle between the legs; and to provide directions to adjust the angle between the legs.

For example, the processing circuitry is configured to: run one of the neural networks of the plurality neural network to detect an angle between the arms; and provide directions to adjust the angle between the arms.

For example, wherein the processing circuitry is configured to: run one of the neural networks of the plurality neural network to detect a distance of the user from the sensor; and provide directions to adjust the distance.

For example, the one or more sensors comprise a video camera.

For example, the dataset comprises one or images with two or more images with right or wrong annotation to be a base of prediction by the one or more neural networks.

For example, the dataset comprises one or more annotated images that are modified by a deepfake algorithm.

For example, the device comprises at least one of a mobile device, a computer, a laptop computer, a cellular phone and a tablet.

One other embodiment may include a product comprising one or more tangible computer-readable non-transitory storage media comprising program instructions for guiding a user to comply with one or more application-specific requirements, wherein execution of the program instructions of an application by one or more processors comprising: receiving one or more video frames which include an at least one image of a scene from the one or more sensors; running a neural network on the at least one image to detect an at least one requirement of the one or more application-specific requirements based on a dataset, wherein the detection is done based on at least one or more images stored at the dataset; providing one or more directions to the user to adjust one or more elements in the scene to meet the at least one requirement; and repeating the guiding with one or more other neural networks trained on one or more other datasets until the one or more application-specific requirements at the scene are met.

For example, the at least one requirement comprises a position of one or more body parts and the execution of the program instructions by one or more processors comprising: detecting by the first neural network the position of the one or more body parts based on one or more images of the dataset, and providing directions to adjust the position of the one or more body parts.

For example, the at least one requirement comprises a predetermined pose of a user, and the execution of the program instructions by one or more processors comprising: detecting by the neural network the predetermined pose of the user; and providing directions to adjust the pose of the user to match the predetermined pose.

For example, the at least one requirement comprises an one or more environmental conditions of the scene and the execution of the program instructions by one or more processors comprising: running one the neural network to detect the one or more environmental conditions; and providing directions to adjust the one or more environmental conditions to the application-specific requirement.

For example, the at least one requirement comprises an angle between the legs and the execution of the program instructions by one or more processors comprising: running the neural network to detect an angle between the legs and providing directions to adjust the angle between the legs.

For example, the execution of the program instructions by one or more processors comprising: running one of the neural networks of the plurality neural network to detect an angle between the arms and providing directions to adjust the angle between the arms.

For example, the execution of the program instructions by one or more processors comprising: running one of the neural networks of the plurality neural network to detect a distance of the user from the sensor and providing directions to adjust the distance.

For example, the one or more sensors comprise a video camera.

For example, the dataset comprises one or images with two or more images with right or wrong annotation to be a base of prediction by the one or more neural networks.

For example, the dataset comprises one or more annotated images that are modified by a deepfake algorithm.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units, and/or circuits have not been described in detail so as not to obscure the discussion.

Discussions made herein utilizing terms such as, for example, "processing," "computing," "calculating," "determining," "establishing," "analyzing," "checking," or the like, may refer to operation(s) and/or process(es) of a computer, a computing platform, a computing system, or other electronic computing devices, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality," as used herein, include, for example, "multiple" or "two or more." For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object merely indicate that different instances of like objects are being referred to, and are not intended to imply that the objects so described must be in a given sequence, either temporally, spatially, in ranking, or any other manner.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some demonstrative embodiments, the circuitry may be implemented in, or functions associated with the circuitry may be implemented by one or more software or firmware modules. In some demonstrative embodiments, the circuitry may include logic, at least partially operable in hardware.

The term "logic" may refer, for example, to computing logic embedded in the circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in and/or implemented as part of various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read-only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

The term "module," as used hereinbelow, is an object file that contains code to extend the running kernel environment.

As used herein, the term "Artificial intelligence (AI)" is intelligence demonstrated by machines, unlike the natural intelligence displayed by humans and animals, which involves consciousness and emotionality. The term "artificial intelligence" is used to describe machines (or computers) that mimic "cognitive" functions that humans associate with the human mind, such as, for example, "learning" and "problem-solving."

The term "machine learning (ML)" as used hereinbelow is a study of computer algorithms configured to improve automatically based on a received. ML is a subset of artificial intelligence. Machine learning algorithms build a mathematical model based on sample data, known as "training data," to make predictions or decisions without being explicitly programmed to do so.

As used herein, the term "deep learning," as used hereinbelow, is a class of machine learning algorithms that uses multiple layers to extract higher-level features from the raw input progressively. For example, in image processing, lower layers may identify edges, while higher layers may identify the concepts relevant to a human, such as, for example, digits or letters and/or faces.

The term "Artificial neural networks (ANNs), and/or neural networks (NNs), are computing systems vaguely inspired by the biological neural networks that constitute animal brains.

For example, an ANN is based on a collection of connected units or nodes called artificial neurons, which loosely model the neurons in a biological brain. An artificial neuron that receives a signal may process it and may signal neurons connected to it. For example, the "signal" at a connection is a real number, and the output of each neuron is computed by some non-linear functions of the sum of its inputs. The connections are called edges. Neurons and edges may have a weight that adjusts as learning proceeds. The weight increases or decreases the strength of the signal at a connection. Neurons may have a threshold such that a signal is sent only if the aggregate signal crosses that threshold. The neurons may be aggregated into layers. Different layers may perform different transformations on their inputs.

In some demonstrative embodiments, ways to use non-wearable sensing technologies (like video) to monitor and analyze a subject and provide feedback to a user. For example, the feedback may be based on artificial intelligence (AI) trained on a dataset.

The term "binary neural networks (BNN")," as used hereinbelow, is related to networks with binary weights and activations at run time. At training time, these weights and activations are used for computing gradients. However, the gradients and true weights are stored in full precision. This procedure may provide an effective train of a network on systems with fewer resources.

The term "dataset," as used hereinbelow, is related, but not limited to, to a dataset of human images annotated with attributes related to the correctness of the pose and/or a pasture of a person on at least one image of the dataset. For example, the annotation may include annotation of, for example, the visibility of the person's head, the visibility of selected body parts, distance of the person from a camera, the position of the person in front of the camera, the distance between the person's legs, the angle of the hands from the body and the like.

The term "training," as used hereinbelow, is related to, but not limited to, the training method of one or more neural networks on one or more datasets to predict and/or to detects the attributes. For example, a neural network may predict and/or detect one or more attributes according to a target. The training may be done once, but not limited to, on the server.

The term "ordering," as used hereinbelow, is related to, but not limited to, a scenario of training a plurality of neural networks to work if a certain constraint is currently met. For example, it only makes sense to run the neural network, which predicts "Are the legs sufficiently wide apart?" only after detection of "Legs are visible." Thus, the set of neural networks may be ordered into a chain or directed graph. However, it should be understood that some neural networks may be run in parallel, e.g., predicting head visibility and legs visibility. For example, the neural networks that run in parallel may be combined into a single neural network that predicts both head and legs visibility.

The term "real-time feedback," as used hereinbelow, is related to, but not limited to, a procedure that may start with a camera is being initialized, and a person is in a certain position in front of the camera. For example, in real-time, the neural network may receive a frame of the video as input and may produce the predicted attributes based on the predicted attributes, feedback, e.g., vocal, visual, or the like, may be provided to the user in order to adjust specific parts or the person's position relative to the phone position.

For example, the process may reoccur until the user is in the requested and/or required position, and the actual parameters may be matched, at least in part, to the predefined parameters The term "deepfake," as used hereinbelow, is related to, but not limited to, faking an image of one person to be another person. For example, a person in an existing image or video is replaced with someone else's likeness. Deepfakes leverage powerful techniques from machine learning and artificial intelligence to manipulate or generate visual and audio content with a high potential to deceive. The machine learning methods used to create deepfakes are based on deep learning and involve training generative neural network architectures, such as, for example, autoencoders or generative adversarial networks (GANs).

Figure 1:
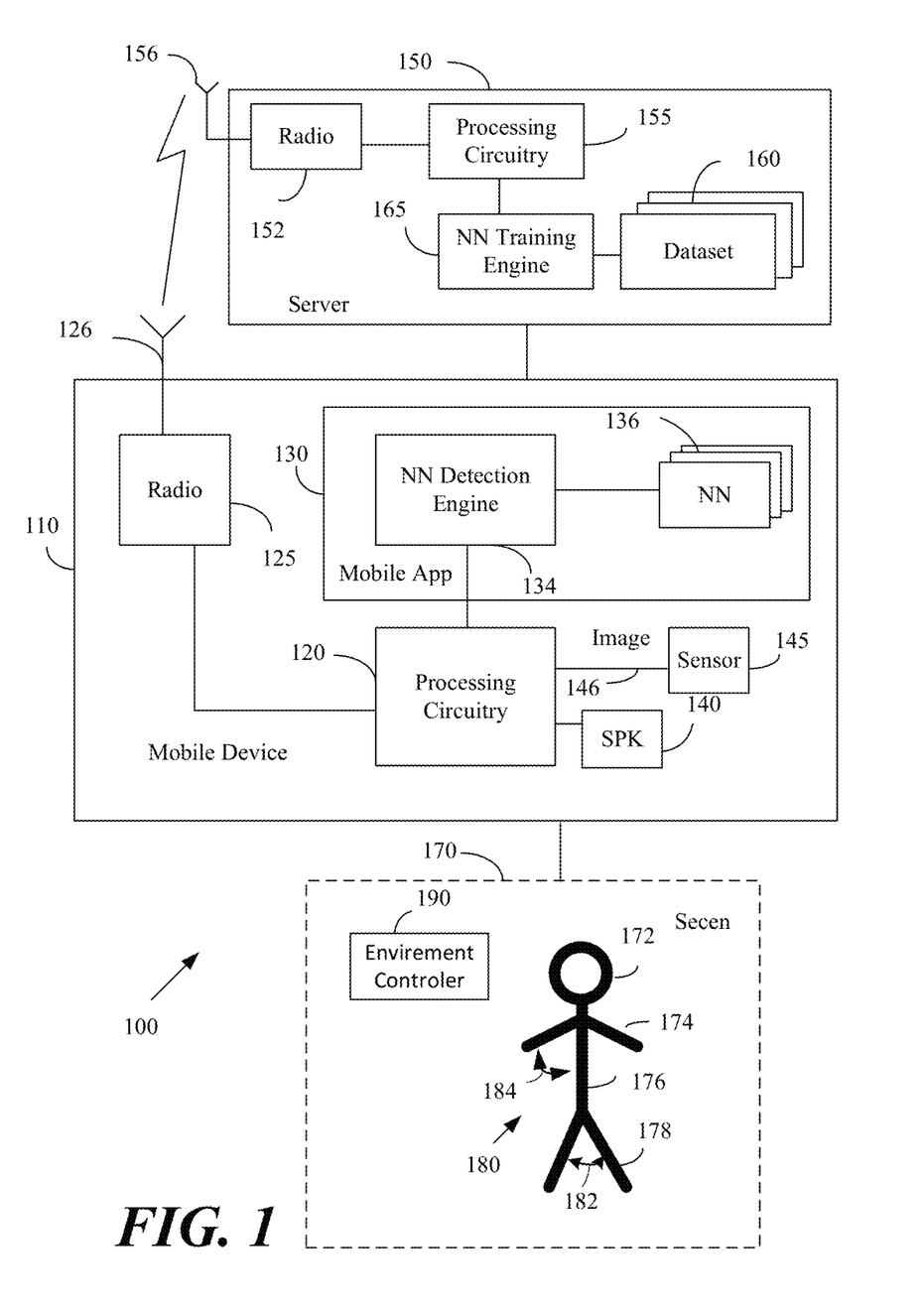
FIG. 1 illustrates a block diagram of a system for guiding a user to comply with one or more application-specific requirements, according to some demonstrative embodiments.

In some demonstrative embodiments, reference is first made to FIG. 1, which is an illustration of block diagrams of a system 100 for guiding a user to comply with one or more application-specific requirements.

In some demonstrative embodiments, system 100 may include a server 150. For example, server 150 may be configured to train a plurality of datasets 160 and may include processing circuitry 155. The processing circuitry may be operably coupled to a radio 152 and to a neural network (NN) training engine 165.

In some demonstrative embodiments, processing circuitry 155 may include at least one of one core processor, muli cores processor, one or more processors, a graphic processor, a digital signal processor (DSP), a controller, a memory, and the like.

In some demonstrative embodiments, processing circuitry 155 may be configured to perform the software instructions of the NN training engine 165. For example, the NN engine 165 may use at least one of resnet-34 architecture or Mobile-Net-V2 and/or Mobile-Net-V3 to train and modeling the plurality of NNs.

In some demonstrative embodiments, the NN training engine 165 may train a plurality of NN on the plurality of datasets 160.

In some demonstrative embodiments, datasets 160 may include a plurality of annotated images and the like.

In some demonstrative embodiments, the NN may include binary/multiclass classification neural networks.

In some demonstrative embodiments, radio 156 may be configured to communicate over the air with user device 110 via one or more antenna 156. For example, radio 156 may include a wireless local area network (WLAN) radio, a wireless wide area network radio (WWLAN), a cellular radio, or the like. The one or more antennas 156 may include at least one of a dipole antenna, yagi antenna, monopole antenna, a dish antenna, an antenna array, or the like In some demonstrative embodiments, system 100 may include a user device 110, e.g., a mobile device. For example, the mobile device may be a cellphone, tablet, laptop computer, dedicated device, and the like.

In some demonstrative embodiments, user device 110 may include processing circuitry 120, an application (App) 130, a radio 125, one or more sensors 145, e.g., a video camera, and a speaker 140.

In some demonstrative embodiments, processing circuitry 120 may include at least one of one core processor, muli cores processor, one or more processors, a graphic processor, a digital signal processor (DSP), a controller, a memory, and the like.

In some demonstrative embodiments, processing circuitry 120 may be configured to perform the software instructions of the NN detection engine 134.

In some demonstrative embodiments, NN detection engine 134 may be operably coupled to one or more neural networks 136, e.g., binary neural networks or other types of neural networks.

In some demonstrative embodiments, radio 125 may be configured to communicate over the air with server 150 via one or more antenna 126. For example, radio 156 may include a wireless local area network (WLAN) radio, a wireless wide area network radio (WWLAN), a cellular radio, or the like. The one or more antennas 156 may include at least one of a dipole antenna, yagi antenna, monopole antenna, a dish antenna, an antenna array, or the like In some demonstrative embodiments, processing circuitry 120 may receive one or more video frames from one or more sensors 145, e.g., video camera. For example, the one or more video frames may include at least one image 146 of scene 170.

In some demonstrative embodiments, processing circuitry 120 may run App 130. App 130 may be configured to detect at least one requirement of the one or more application-specific requirements based on the one or more images 146. For example, a neural network may run on the at least one image to detect an at least one requirement of the one or more application-specific requirements based on a dataset, wherein the detection is done based on at least one or more images stored at the dataset, e.g., annotated images.

In some demonstrative embodiments, App 134 may generate direction to a user 180 to adjust his posture and/or pose and/or position based on the detection. Processing circuitry 120 may provide one or more directions to the user to adjust one or more elements in the scene to meet the at least one requirement, for example, voice direction using speaker 140.

In some demonstrative embodiments, processing circuitry 120 may repeat the guiding with one or more other neural networks trained on one or more other datasets until the one or more application-specific requirements at the scene are met.

In some demonstrative embodiments, the neural networks of the plurality neural network 136 may be configured to detect a distance of the user from the sensor 145, e.g., video camera, and provide directions to adjust the distance until the user may stand in the required distance.

In some demonstrative embodiments, for example, the at least one requirement may include a position of one or more body parts, and the neural network may be configured to detect the position of the one or more body parts based on one or more images of the dataset, e.g., dataset 160, and processing circuitry 120 may provide directions to adjust the position of the one or more body parts.

For example, one neural network may detect a head 172 of user 180. A second neural network may be configured to detect arms 184 of user 180. A third neural network may be configured to detect an angle between the arms 184, a fifth neural network may be configured to detect legs 178 of user 180, and a sixth neural network may detect an angle between the legs 182, although it should be understood that the discloser is not limited to above examples.

In some demonstrative embodiments, the neural network may detect two or more elements. For example, legs 178 and the angle between the legs 182, if desired.

In another example, the at least one requirement may include a predetermined pose of a user, and the neural network is configured to detect the predetermined pose 176 of the user. The processing circuitry 120 may provide directions to adjust the pose of the user to match the predetermined pose until user 180 is in the required pose.

In some demonstrative embodiments, the at least one requirement may include one or more environmental conditions of scene 170, and processing circuitry 120 may be configured to run one the neural network to detect the one or more environmental conditions, for example, a light condition and the processing circuitry may be configured to provide directions to adjust the one or more environmental conditions until it met to the application-specific requirement. For example, the processing circuitry 120 may transmit commands, via radio 120, to an environment controller 190 to adjust the light condition until the light is at the required level. In some other embodiment, the user 180 may adjust the light.

It should be understood that user 180 is an example only, and two or more users may be in scene 170.

It also should be understood that neural networks can detect body parts such as, for example, neck, hands, feet, eyes, or the like.

It also should be understood that the neural network can detect any object and/or element at scene 170.

Advantageously, a user may be guided to stand and the requested pose in front of the camera in very efficient use of trained neural networks which saves computing resources.

Figure 2:
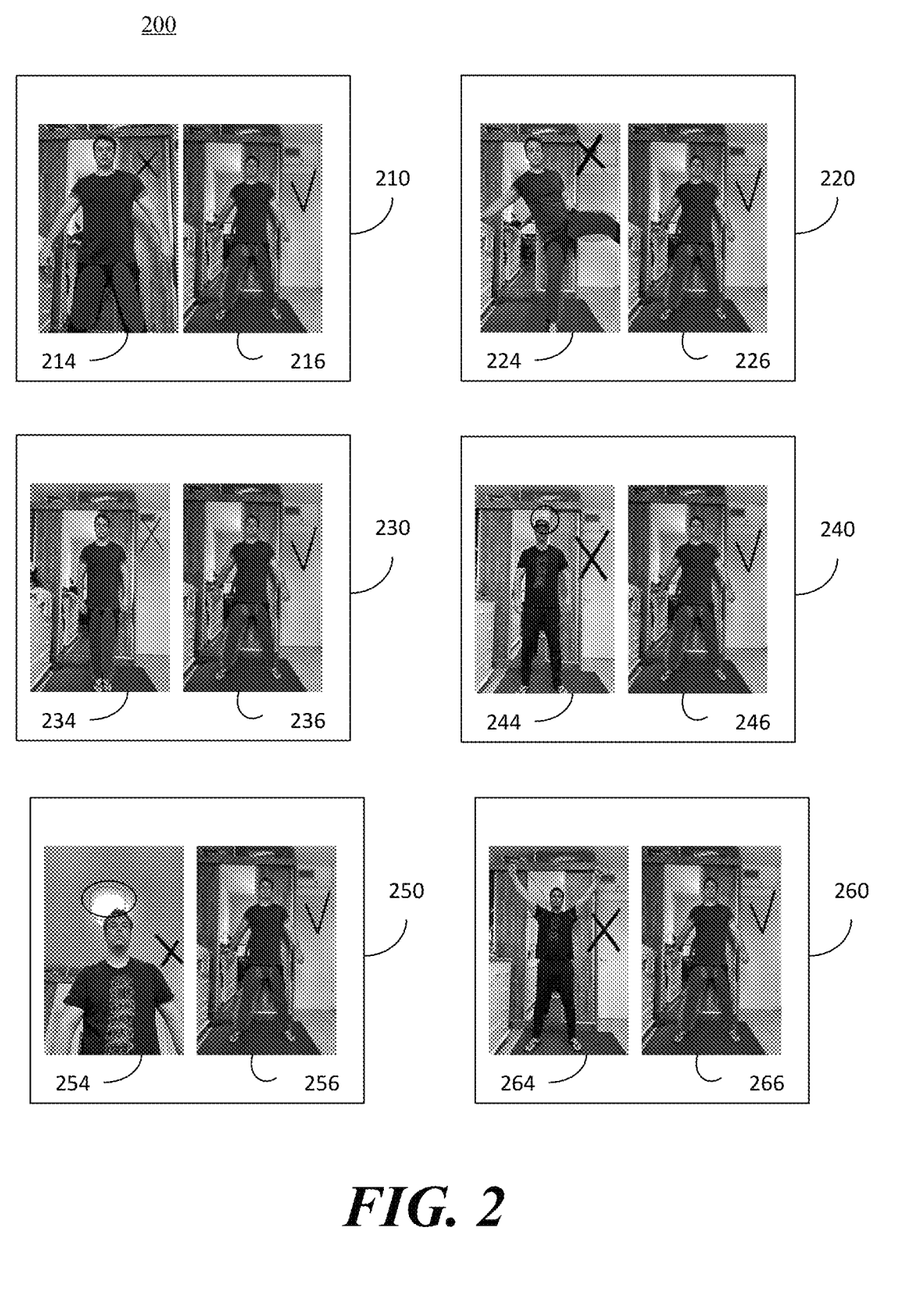
FIG. 2 illustrates a dataset, according to some demonstrative embodiments.

Reference is now made to FIG. 2, which is an illustration of a plurality of datasets 200, according to some demonstrative embodiments.

In some demonstrative embodiments, the plurality of datasets 200 may include but is not limited to dataset 210, which may be configured to train a neural network to detect that the person in the scene may be too close to the camera. For example, dataset 210 may include an image 214 and an image 216. Image 214 may show a person standing too close to the camera and annotate as wrong, e.g., "X" and image 216 shows a person in the correct position and with the right distance from the camera and annotated with "V". The neural network may be trained based on the annotation and the content of the images.

In some demonstrative embodiments, the plurality of datasets 200 may include but is not limited to dataset 220, which may be configured to train a neural network to detect that the person in the scene may stand in the wrong pose and/or the angle between the legs is wrong and/or one leg is not fully shown. For example, dataset 220 may include an image 224 and an image 226. Image 224 may show a person standing with one leg upward and annotate as wrong, e.g., "X" and image 226 shows a person in the correct position and with the right angle between the legs and fully shown legs and annotated with "V." The neural network may be trained based on the annotation and the content of the images.

In some demonstrative embodiments, the plurality of datasets 200 may include but is not limited to dataset 230, which may be configured to train a neural network to detect that the person in the scene may stand in the wrong pose and/or the angle between the legs may be wrong and/or the angle between the arms may be wrong. For example, dataset 230 may include an image 234 and an image 236. Image 234 may show a person standing with tight legs and arms tight to the body and annotate as wrong, e.g., "X" and image 226 shows a person in the correct position and with the right angle between the legs and fully shown legs and annotated with "V." The neural network may be trained based on the annotation and the content of the images.

In some demonstrative embodiments, the plurality of datasets 200 may include but is not limited to dataset 240, which may be configured to train a neural network to detect a hat (surrounded by a circle) on the person's head. For example, dataset 240 may include an image 244 and an image 246. Image 244 may show a hat on the person's head (surrounded by a circle) and annotate as wrong, e.g., "X" and image 246 shows a person in the correct position and with no hat on its head and annotated with "V." The neural network may be trained based on the annotation and the content of the images.

In some demonstrative embodiments, the plurality of datasets 200 may include but is not limited to dataset 250, which may be configured to train a neural network to detect lighting conditions on the scene. For example, dataset 250 may include an image 254 and an image 256. Image 254 may show light above the person's head (surrounded by a circle) and annotate as wrong, e.g., "X" and image 256 shows a person in the correct position and with no light above its head and annotated with "V." The neural network may be trained based on the annotation and the content of the images.

In some demonstrative embodiments, the plurality of datasets 200 may include but is not limited to dataset 260, which may be configured to train a neural network to an angle between the arm. For example, dataset 260 may include an image 264 and an image 266. Image 264 may show that the arms raised and annotate as wrong, e.g., "X" and image 266 shows a correct angle of the arms from the person's body and annotated with "V." The neural network may be trained based on the annotation and the content of the images.

In some demonstrative embodiments, the one or more annotated images may be modified by a deepfake algorithm.

In some demonstrative embodiments, the data stored in the dataset, e.g., images, may include RGB, depth maps, point clouds, or the like In some demonstrative embodiments, the neural network may recognize whether a certain part of the body is visible, e.g., the legs n images 220 and 230. The neural network may be trained on dataset 200 with the corresponding annotation. For example, the annotation may designate which body part is visible.

In one example, the neural network may be trained to predict the correctness of the legs and/or the user pose. The images may be annotated with the legs and the position of the legs.

In some demonstrative embodiments, datasets may have diverse people or different nationalities captured in different environments and lighting conditions. The dataset may be stored on the server.

Figure 3:
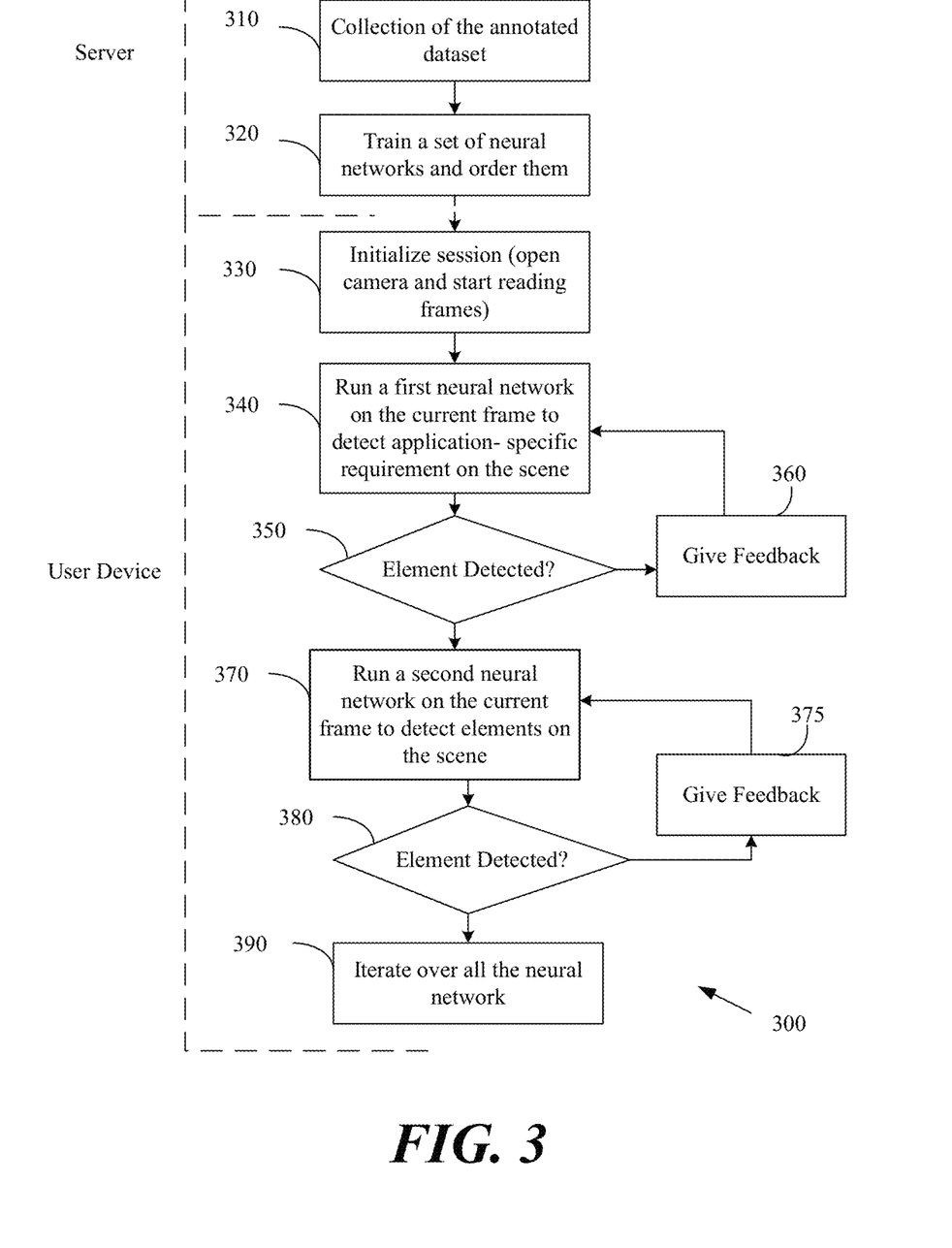
FIG. 3 illustrates a flow chart of a method for guiding a user to comply with one or more application-specific requirements, according to some demonstrative embodiments.

In some demonstrative embodiments, a deepfakes technology may be used to create datasets for any pose without taking an actual photo of all the people standing in the desired pose Reference is now made to FIG. 3, which is an illustration of a flow chart of a method 300 for guiding a user to comply with one or more application-specific requirements, according to some demonstrative embodiments.

In some demonstrative embodiments, method 300 for monitoring bio-mechanic activity by processing circuitry, e.g., processing circuitry 155 (FIG. 1), of a server, e.g., server 150 (FIG. 1), which may include an NN training engin 165 and a collection of annotated datasets, e.g., dataset 160 (FIG. 1) (text box 310). For example, the NN training engine 165 may be configured to train a set of neural networks and order them (text box 320).

In some demonstrative embodiments, in the user device, e.g., user device 110 (FIG. 1), an application, e.g., mobile App 130 (FIG. 1), which run on a processor circuitry, e.g., processor circuitry 120 (FIG. 1), may be configured to initialize a guiding session by open a camera, e.g., sensor 145 (FIG. 1), and may read frames received from the camera (text box 330)

In some demonstrative embodiments, the mobile App may be configured to run a first neural network on a received frame, e.g., image, to detect an application-specific requirement, e.g., arms of the user, at a scene, e.g., scene 170 (FIG. 1) (text box 340). If the neural network detected the required element (text box 350) and the element is not in the right posture, pose and/or position, the application may provide feedback to the user (text 360), for example, to lift the right arm. The user may lift the right arm, and the neural network may run again to detect the arm and provide feedback. The process may continue until the arm is in the right pose.

In some demonstrative embodiment, after one of the application-specific requirements has been met, the process may continue with a second neural network that has been trained to detect another requirement, e.g., a distance of the user from the camera. The second neural network may detect the required element at the scene (text box 370) and may give feedback to the user (text box 375). For example, the application may provide feedback to the user (text 375), for example, "move backward." The user may step backward, and the second neural network may be rerun to detect the distance from the camera and provide feedback. The process may continue until the user is in the required distance.

In some demonstrative embodiment, the process may continue with all the other neural networks, each trained on a specific requirement. For example, the neural networks may be iterate one after another until all the application-specific requirements are met. Although it should be understood that this is an example only and in other embodiments, the method may be operated on two or more users in parallel and/or iterating two or more neural networks at the same time.

Figure 4:
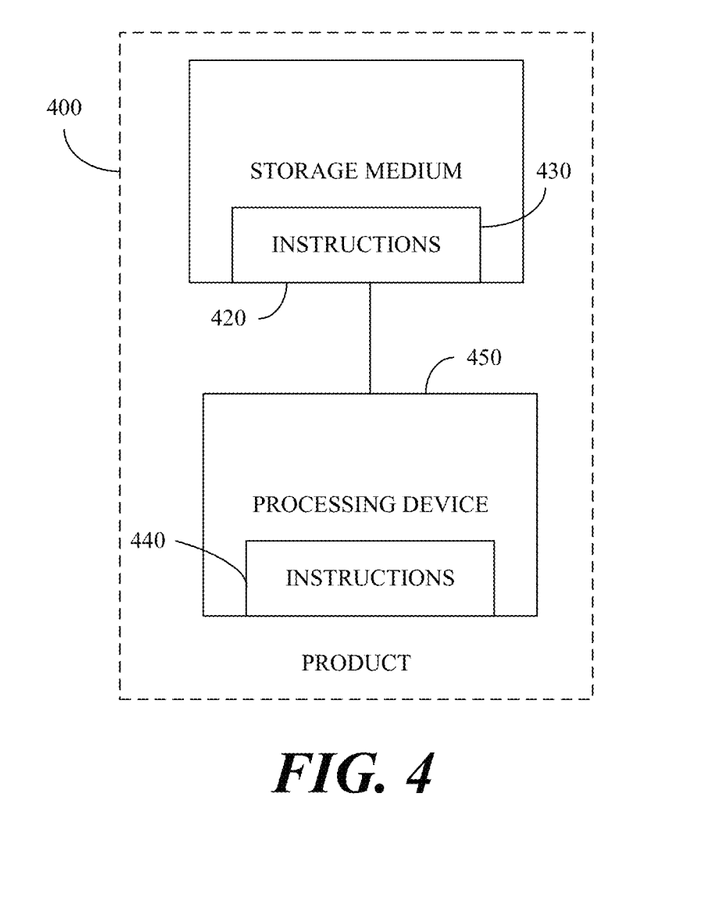
FIG. 4 illustrates a product of manufacture, according to some demonstrative embodiments.

According to some demonstrative embodiments, reference is now made to FIG. 4, which is a schematic illustration of a product of manufacture 400. Product 400 may include one or more tangible computer-readable non-transitory storage medium 420, which may include computer-executable instructions 430, implemented by processing device 450, operable to, when executed by at least one computer processor, enable at least one processing circuitry 120 (FIG. 1) to implement one or more program instructions for guiding a user to comply with one or more application-specific requirements as described above with reference to FIGS. 1-3. The phrase "non-transitory machine-readable medium" is directed to include all computer-readable media, with the sole exception being a transitory propagating signal.

In some demonstrative embodiments, product 400 and/or machine-readable storage medium 420 may include one or more types of computer-readable storage media capable of storing data, including volatile memory, non-volatile memory, removable or non-removable memory, erasable or non-erasable memory, writeable or re-writeable memory, and the like. For example, machine-readable storage medium 420 may include any type of memory, such as, for example, RAM, DRAM, ROM, programmable ROM (PROM), erasable programmable ROM (EPROM), electrically erasable programmable ROM (EEPROM), Flash memory, a hard disk drive (HDD), a solid-state disk drive (SSD), fusen drive, and the like. The computer-readable storage media may include any suitable media involved with downloading or transferring a computer program from a remote computer to a requesting computer carried by data signals embodied in a carrier wave or other propagation medium through a communication link, e.g., a modem, radio, or network connection.

In some demonstrative embodiments, processing device 450 may include logic. The logic may include instructions, data, and/or code, which, if executed by a machine, may cause the machine to perform a method, process, and/or operations as described herein. The machine may include, for example, any suitable processing platform, computing platform, computing device, processing device, a computing system, processing system, computer, processor, or the like, and may be implemented using any suitable combination of hardware, software, firmware, and the like.

In some demonstrative embodiments, processing device 450 may include or may be implemented as software, firmware, a software module, an application, a program, a subroutine, instructions, an instruction set, computing code, words, values, symbols, and the like. Instructions 440 may include any suitable types of code, such as source code, compiled code, interpreted code, executable code, static code, dynamic code, and the like. Instructions may be implemented according to a predefined computer language, manner or syntax, for instructing a processor to perform a specific function. The instructions may be implemented using any suitable high-level, low-level, object-oriented, visual, compiled and/or interpreted programming languages, such as C, C++, C #, Java, Python, BASIC, Matlab, assembly language, machine code, markup language, and the like.

It is to be understood that the system and/or the method of guiding a user to comply with one or more application-specific requirements described hereinabove by way of example only. Other embodiments may be implemented base on the detailed description and the claims that followed.

It is to be understood that like numerals in the drawings represent like elements through the several figures and that not all components and/or steps described and illustrated with reference to the figures are required for all embodiments or arrangements.

It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein.

It should be appreciated that according to at least one embodiment, one or more computer programs, modules, and/or applications that, when executed, perform methods of the present invention need not reside on a single computer or processor but can be distributed in a modular fashion amongst a number of different computers or processors to implement various aspects of the systems and methods disclosed herein.

Thus, illustrative embodiments and arrangements of the present systems and methods provide a computer-implemented method, computer system, and computer program product for processing code(s). The flowchart and block diagrams in the Figures illustrate the architecture, functionality, and operation of possible implementations of systems, methods, and computer program products according to various embodiments and arrangements. In this regard, each block in the flowchart or block diagrams can represent a module, segment, or portion of code, which comprises one or more executable instructions for implementing the specified logical function(s).

It should also be noted that, in some alternative implementations, the functions noted in the block can occur out of order noted in the figures. For example, two blocks shown in succession may be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by particular purpose hardware-based systems that perform the specified functions or acts or combinations of specialized purpose hardware and computer instructions.

The terminology used herein is to describe particular embodiments only and is not intended to be limiting the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein are for the purpose of description and should not be regarded as limiting. The use of "including," "comprising," or "having," "containing," "involving," and variations thereof herein is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described and without departing from the true spirit and scope of the present invention, which is set forth in the following claims.

What is claimed is:

1. A system for guiding a user to comply with one or more application-specific requirements comprising a user device comprises processing circuitry and one or more sensors, wherein the processing circuitry is configured to:
   receive one or more video frames which include an at least one image of a scene from the one or more sensors;
   run a first trained neural network of a plurality of trained neural networks on the at least one image to detect a first application-specific requirement of the one or more application-specific requirements based on a dataset, wherein the detection is done based on at least one or more images stored at the dataset;
   provide one or more directions to the user to adjust one or more elements in the scene until the first application-specific requirement is met;
   run a second trained neural network of the plurality of the trained neural networks to detect a second application-specific requirement that includes an angle between the legs and provide directions to the user to adjust the angle between the legs until a predefined angle between the legs is met;
   run a third trained neural network of the plurality of the trained neural networks to detect a third application-specific requirement that includes an angle between the arms and provide directions to the user to adjust the angle between the arms until a predefined angle between the arms is met; and
   run, one after another, all the other trained neural networks on all the other application-specific requirements and provide direction for each requirement until all the one or more application-specific requirements at the scene are met.

2. The system of claim 1, wherein a fourth application-specific requirement of the one or more application-specific requirements comprises a position of one or more body parts and a fourth trained neural network is configured to detect the position of the one or more body parts based on one or more images of the dataset; and provide directions to adjust the position of the one or more body parts.

3. The system of claim 1, wherein a fifth application-specific requirement of the one or more application-specific requirements comprises a predetermined pose of a user, and a fifth trained neural network is configured to detect the predetermined pose of the user; and provide directions to adjust the pose of the user to match the predetermined pose.

4. The system of claim 1, wherein a sixth application-specific requirement comprises a one or more environmental conditions of the scene and the processing circuitry is configured to:

run a sixth trained neural network to detect the one or more environmental conditions; and provide directions to adjust the one or more environmental conditions to meet the sixth application-specific requirement.

5. The system of claim 1, wherein the processing circuitry is configured to:

run a seventh trained neural network of the plurality of the trained neural networks to detect a distance of the user from the sensor; and provide directions to adjust the distance.

6. The system of claim 1, wherein the one or more sensors comprise a video camera.

7. The system of claim 1, wherein the dataset comprises one or images with two or more images with right or wrong annotation to be a base of prediction by the one or more of the trained neural networks.

8. The system of claim 1, wherein the dataset comprises one or more annotated images that are modified by a deepfake algorithm.

9. The system of claim 1, wherein the user device comprises at least one of a mobile device, a computer, a laptop computer, a cellular phone, and a tablet.

10. A product comprising one or more tangible computer-readable non-transitory storage media comprising program instructions for guiding a user to comply with one or more application-specific requirements, wherein execution of the program instructions of an application by one or more processors comprising:

receiving one or more video frames which include an at least one image of a scene from the one or more sensors;

running a first trained neural network of a plurality of trained neural networks on the at least one image to detect a first application-specific requirement of the one or more application-specific requirements based on a dataset, wherein the detection is done based on at least one or more images stored at the dataset;

providing one or more directions to the user to adjust one or more elements in the scene until the first application-specific requirement is met;

running a second trained neural network of the plurality of the trained neural networks to detect a second application-specific requirement that includes an angle between the legs and provide directions to the user to adjust the angle between the legs until a predefined angle between the legs is met;

running a third neural network of the plurality of trained neural networks to detect a third application-specific requirement that includes an angle between the arms and provide directions to the user to adjust the angle between the arms until a predefined angle between the arms is met; and running, one after another, all other trained neural networks on all the other application-specific requirements and providing direction for each requirement until all the one or more application-specific requirements at the scene are met.

11. The product of claim 10, wherein a fourth application-specific requirement comprises a position of one or more body parts and the execution of the program instructions by one or more processors comprising:

detecting by a fourth trained neural network the position of the one or more body parts based on one or more images of the dataset; and providing directions to adjust the position of the one or more body parts.

12. The product of claim 10, wherein a fifth application-specific requirement comprises a predetermined pose of a user, and the execution of the program instructions by one or more processors comprising:

detecting by the a fifth trained neural network the predetermined pose of the user; and providing directions to adjust the pose of the user to match the predetermined pose.

13. The product of claim 10, wherein a sixth application-specific requirement comprises a one or more environmental conditions of the scene and the execution of the program instructions by one or more processors comprising:

running one a sixth trained neural network to detect the one or more environmental conditions; and providing directions to adjust the one or more environmental conditions to meet the sixth application-specific requirement.

14. The product of claim 10, wherein the execution of the program instructions by one or more processors comprising:

running a seventh trained neural networks of the plurality of the trained neural networks to detect a distance of the user from the sensor; and providing directions to adjust the distance.

15. The product of claim 10, wherein the dataset comprises one or images with two or more images with right or wrong annotation to be a base of prediction by the one or more of the trained neural networks.

16. The product of claim 10, wherein the dataset comprises one or more annotated images that are modified by a deepfake algorithm.

* * * * *